United States Patent
Mao et al.

(10) Patent No.: US 10,447,129 B2
(45) Date of Patent: Oct. 15, 2019

(54) VIBRATION MOTOR

(71) Applicant: AAC Technologies Pte, Ltd., Singapore (SG)

(72) Inventors: Lubin Mao, Shenzhen (CN); Fanghua Ling, Shenzhen (CN); Zixu Hua, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 343 days.

(21) Appl. No.: 15/645,812

(22) Filed: Jul. 10, 2017

(65) Prior Publication Data

US 2018/0297061 A1    Oct. 18, 2018

(30) Foreign Application Priority Data

Apr. 14, 2017 (CN) .................... 2017 2 0397176 U

(51) Int. Cl.
*H02K 33/00* (2006.01)
*B06B 1/04* (2006.01)
*H02K 5/04* (2006.01)
*H02K 33/16* (2006.01)
*H02K 33/02* (2006.01)

(52) U.S. Cl.
CPC ............. *H02K 33/00* (2013.01); *B06B 1/045* (2013.01); *H02K 5/04* (2013.01); *H02K 33/02* (2013.01); *H02K 33/16* (2013.01)

(58) Field of Classification Search
CPC .......... B06B 1/045; H02K 5/04; H02K 33/00; H02K 33/02; H02K 33/16
See application file for complete search history.

(56) References Cited

U.S. PATENT DOCUMENTS

| 8,575,794 | B2 * | 11/2013 | Lee ..... | H02K 33/18 |
| | | | | 310/12.31 |
| 10,008,894 | B2 * | 6/2018 | Mao ..... | H02K 1/34 |
| 10,220,412 | B2 * | 3/2019 | Mao ..... | B06B 1/045 |
| 2003/0124990 | A1 * | 7/2003 | Kawano ..... | B06B 1/045 |
| | | | | 455/90.1 |
| 2011/0012442 | A1 * | 1/2011 | Jun ..... | H02K 1/34 |
| | | | | 310/25 |

(Continued)

FOREIGN PATENT DOCUMENTS

GB    2471913 A * 1/2011 ............. B06B 1/045

*Primary Examiner* — Mohamad A Musleh
(74) *Attorney, Agent, or Firm* — IPro, PLLC; Na Xu

(57) ABSTRACT

A vibration motor includes a housing, an electromagnetic driving device accommodated in the housing, a vibrator, and an elastic component elastically supporting the vibrator. The vibrator has a hollow portion penetrating through upper and lower surfaces of the vibrator in a direction perpendicular to vibrating direction, and the hollow portion is defined by a first inner wall along the vibrating direction and a second inner wall connected with the first inner wall, the electromagnetic driving device is in the hollow portion and fixed on the housing, a distance between the electromagnetic driving device and the second inner wall in vibrating direction is greater than the maximum amplitude of the vibrator, on the housing, a stopper is provided between the inner wall and the electromagnetic driving device. The present disclosure can bring the product reliability under premise of guaranteeing the driving force and the size.

10 Claims, 3 Drawing Sheets

(56) References Cited

U.S. PATENT DOCUMENTS

| | | | |
|---|---|---|---|
| 2011/0068640 A1* | 3/2011 | Choi | H02K 5/04 |
| | | | 310/25 |
| 2011/0068641 A1* | 3/2011 | Choi | H02K 33/16 |
| | | | 310/25 |
| 2017/0117788 A1* | 4/2017 | Hou | H02K 1/34 |
| 2018/0115231 A1* | 4/2018 | Xu | B06B 1/045 |
| 2018/0236488 A1* | 8/2018 | Miyazaki | B06B 1/045 |
| 2018/0241293 A1* | 8/2018 | Miyazaki | H02K 33/16 |

* cited by examiner

VIBRATION MOTOR

TECHNICAL FIELD

The present disclosure relates to a vibration motor and, in particular, to a linear vibration motor vibrating along the horizontal direction.

BACKGROUND

With the development of electronic technologies, portable consuming electronic products such as cellphones, handheld game player, navigation device or handheld multimedia entertainment devices and the like are becoming more and more popular. Generally, a vibration motor will be used for system feedback such as call prompt, message prompt, navigation prompt of the cellphone, or vibration feedback of the game player, etc. Such a wide application requires good performance and long service life of the vibration motor.

An electromagnetic driving device is located in a vibration motor at the center of a vibrator. The vibration motor has got extensive attentions due to its properties of strong driving force, good vibration performance, small thickness, etc. Traditional vibration motor is usually provided with a stopper below the elastic component, so as to protect the vibration device when falling off. However, since the vibration motor with such a structure has a small thickness and is usually of a four-spring structure, the stopper cannot be arranged at this position. Therefore, the spring cannot provide protection to the vibration device when falling off.

Therefore, a new vibration motor is needed to solve the problem.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views

DESCRIPTION OF EMBODIMENTS

The present disclosure will be further illustrated with reference to the accompanying drawings.

Figure 1:
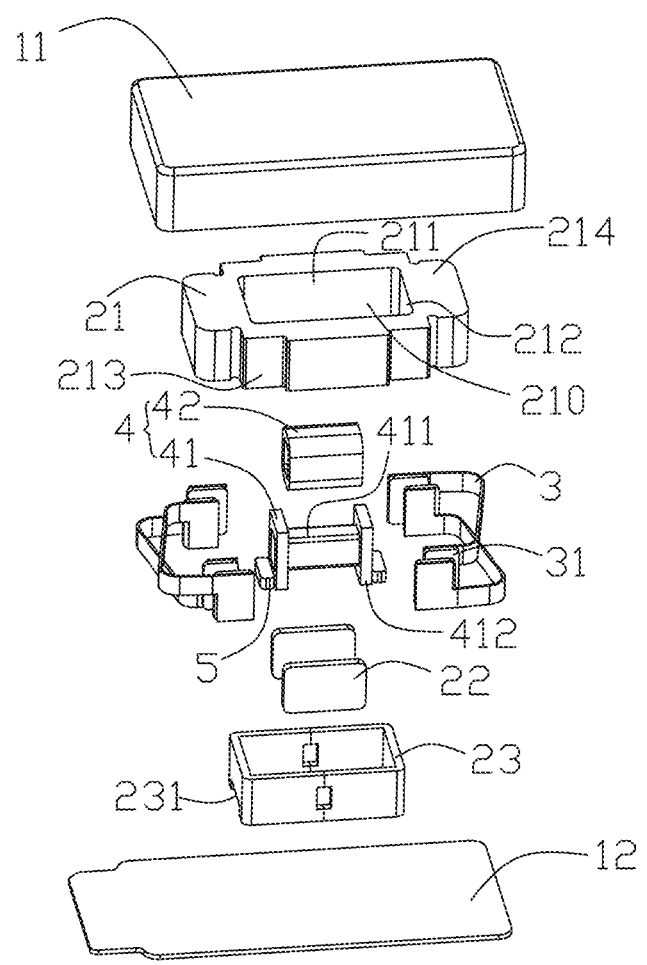
FIG. 1 is an exploded structural schematic view of a vibration motor in accordance with an exemplary embodiment of the present disclosure.
Figure 2:
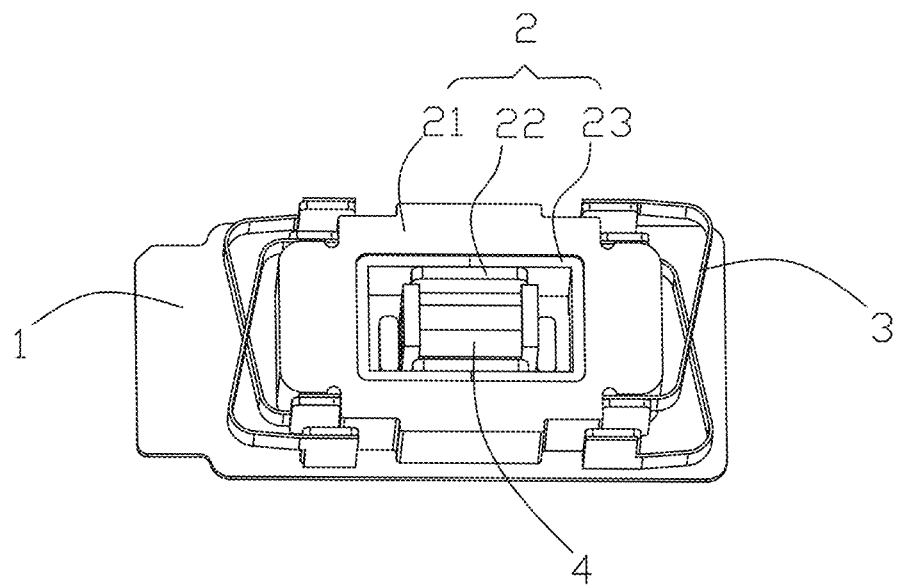
FIG. 2 is a structural schematic view of a vibration motor being partially assembled in accordance with an exemplary embodiment of the present disclosure.

As shown in FIG. 1 and FIG. 2, the present disclosure provides a vibration motor 100, including a housing 1, a vibrator 2 accommodated in the housing 1, an elastic component 3 elastically supporting the vibrator 2, and an electromagnetic driving device 4 driving the vibrator 2 to vibrate.

The housing 1 includes an upper housing 11 having a side wall and a bottom plate 12 as a bottom wall of the housing.

The bottom plate 12 covers the upper housing 11 and forms accommodation space together with the upper housing 11. The electromagnetic driving device 4 is fixed on the bottom plate 12, the elastic component 3 is fixed on a side wall of the upper housing 11 and supports the vibrator 2 to vibrate in a direction parallel to the bottom plate 12.

The vibrator 2 includes a weight 21, a magnet 22 and a yoke 23, and the magnet 22 and the yoke 23 are disposed on the weight 21. The weight 21 includes a first surface 214 perpendicular to the vibrating direction and a second surface (not shown) opposite to the first surface 214. The weight 21 includes a hollow portion 210 penetrating through the first surface 214 and the second surface of the vibrator along a direction perpendicular to the vibrating direction. Specifically, in an exemplary embodiment, the hollow portion 210 includes a pair of first inner walls 211 and a pair of second inner walls 212 connected with the first inner wall 211. An extending direction of the first inner wall 211 is parallel to the vibrating direction of vibrator 2, and an extending direction of the second inner wall 212 is perpendicular to the vibrating direction of vibrator 2. The yoke 23 is formed as an annular structure by two symmetrical semi-annular structures and is attached onto the first inner wall 211 and the second inner wall 212. The magnet 22 is located at the junction of the two semi-annular structures, i.e., two magnets 22 are respectively located at central portions of the two first inner walls 211.

The electromagnetic driving device 4 is disposed in the hollow portion 210 and is respectively spaced from the first inner wall 211 and the second inner wall 212. A distance between the electromagnetic driving device 4 and the second inner wall 212 in the vibrating direction is greater than the maximum amplitude of the vibrator. Since the electromagnetic driving device 4 is the stator fixed on the bottom plate 12, and the vibrator 2 vibrates under the support of the elastic component 3, when the vibration motor is working, the electromagnetic driving device 4 relatively moves close to or away from the second inner wall 212.

In an exemplary embodiment, the electromagnetic driving device 4 is composed of a coil 42 and an iron core 41 winded by the coil 42. An extension direction of the iron core 41 is the vibrating direction of the vibrator 2, i.e., a direction parallel to the first inner wall 211. Since two magnets 22 are located at two sides of the iron core 41, a uniform magnetic field will be generated in the range of coil 42, and the coil 42 is subjected to a force after being energized, so as to drive the vibrator 2 to vibrate along the direction of the first inner wall 211.

The iron core 41 includes a main portion 411 winded by the coil 42 and a fixing end 412 respectively located at two ends of the main portion 411 and the coil 42. The iron core 41 is fixed on the bottom plate 12 of the housing by the fixing end 412.

The bottom plate 12 is provided with a stopper 5 which is fixed and abutted with the fixing end 412. The stopper 5 is located in a path where the vibrator 2 relatively moves with respect to the second inner wall 212, which can limit the excessive vibration of the vibration motor or protect the vibrator 2 in case of falling off. Specifically, in an exemplary embodiment, the stopper 5 is connected with the end 412 of the electromagnetic driving device 4.

Figure 3:
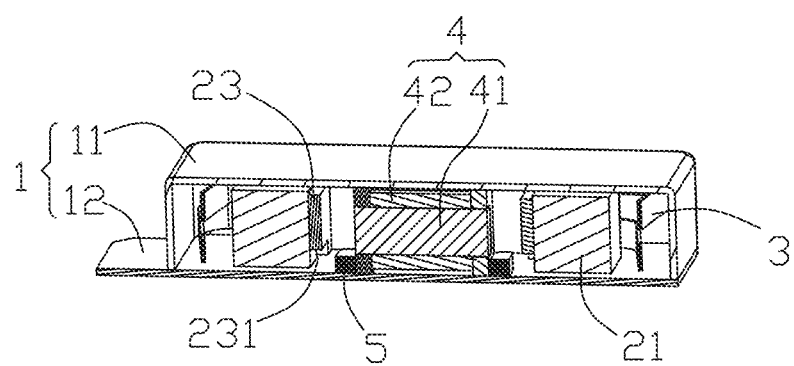
FIG. 3 is a sectional view of a vibration motor in accordance with an exemplary embodiment of the present disclosure.

Further, with reference to FIG. 3, a side of the yoke 23 which is close to the bottom plate 12 is provided with a first avoiding portion 231 to provide space for the stopper 5, thereby making full use of the space, increasing available vibrating amplitude of the vibrator 2 and thus improving vibration performance of the vibrator 2.

The weight 21 is further provided with a fixing step 213 configured to fix the elastic component 3. In an exemplary embodiment, four elastic components 3 are provided in total, and all of the four elastic components 3 are of a C-shaped spring structure and respectively fixed at four corners of the vibrator 2. Correspondingly, four fixing steps 213 are also provided and are fixed at four corners of the side wall which connects the first surface 214 with the second surface. One end of the elastic component 3 is fixed on the fixing step 213, and the end of the elastic component 3 is connected with the side wall of the housing 1.

Further, the elastic component 3 is also provided with a buffer plate 31. The buffer plate is usually made of a soft material like foam, which can avoid from affecting reliability of the product due to collision of the vibration motor in case of falling off or excessive vibration.

Figure 4:
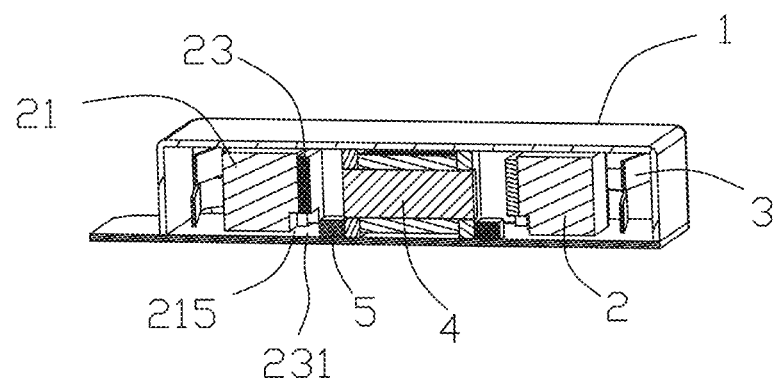
FIG. 4 is a sectional view of a vibration motor in accordance with another exemplary embodiment of the present disclosure.

Another embodiment of the present disclosure is shown with reference to FIG. 4, which is similar to the previous embodiment. The vibration motor includes a housing 1, a vibrator 2 accommodated in the housing 1, an elastic component 3 that elastically supports the vibrator 2, and an electromagnetic driving device 4 driving the vibrator 2 to vibrate. The housing 1 is provided with a stopper 5. And a yoke 23 is provided with the first avoiding portion 231 for providing space for the stopper 5.

The difference is that, in an exemplary embodiment, the weight 21 is also provided with a second avoiding portion 215. The second avoiding portion 215 is correspondingly configured and connected with the first avoiding portion 231 to form space with a long distance, which can provide the vibrator with further available vibration range and thus improve the vibration performance of the vibrator.

In the vibration motor of the present disclosure, the vibrator is provided with the hollow portion, and the electromagnetic driving device is arranged in the hollow portion, the stopper is provided between the electromagnetic driving device and the vibrator, which can achieve the function of fall protection and provide the product reliability under premise of guaranteeing the driving force and the size.

The above shows and describes the embodiments of the present disclosure, it should be understood that, the above-described embodiments are only exemplary and should not be construed as limiting the present disclosure, and those skilled in the art may, within the scope of the present disclosure, make changes, modifications, substitutions, or variations of the above-described embodiments.

What is claimed is:

1. A vibration motor, comprising:
a housing,
an electromagnetic driving device accommodated in the housing,
a vibrator, and
an elastic component elastically supporting the vibrator, wherein, the vibrator comprises a first surface perpendicular to a vibrating direction and a second surface opposite to the first surface, and the vibrator comprises a hollow portion penetrating through the first surface and the second surface of the vibrator in a direction perpendicular to the vibrating direction, and the hollow portion is defined by a pair of first inner walls along the vibrating direction and a second inner wall connected with the first inner wall, the electromagnetic driving device is arranged in the hollow portion and is fixed on the housing, and a distance between the electromagnetic driving device and the second inner wall in the vibrating direction is greater than a maximum amplitude of the vibrator, and a stopper is provided on the housing between the second inner wall and the electromagnetic driving device.

2. The vibration motor as described in claim 1, wherein the electromagnetic driving device comprises an iron core and a coil winding the iron core, the vibrator comprises a weight defining the hollow portion and a magnet fixed on the first inner wall, and the magnet is spaced from the electromagnetic driving device.

3. The vibration motor as described in claim 2, wherein the vibrator is also provided with a yoke which is attached onto the first inner wall and the second inner wall, and the magnet is fixed on the first inner wall by the yoke.

4. The vibration motor as described in claim 3, wherein the yoke is of an annular structure formed by two symmetrical semi-annular structures, and the magnet is located at a junction of the two semi-annular structures.

5. The vibration motor as described in claim 3, wherein the housing comprises a bottom plate configured to fix the electromagnetic driving device and the stopper, one side of the yoke which is close to the bottom plate is provided with a first avoiding portion for providing space to the stopper.

6. The vibration motor as described in claim 5, wherein one side of the weight which is close to the bottom wall is provided with a second avoiding portion for providing space to the stopper, and the second avoiding portion is arranged corresponding to the first avoiding portion.

7. The vibration motor as described in claim 2, wherein the iron core comprises a main portion winded by the coil and a fixing end respectively located at two sides of the coil, the coil abuts with the fixing end, and the iron core is fixed on the housing by the fixing end.

8. The vibration motor as described in claim 7, wherein the stopper is connected with the electromagnetic driving device.

9. The vibration motor as described in claim 8, wherein the stopper is fixed and abuts with the fixing end.

10. The vibration motor as described in claim 1, wherein the vibrator is provided with a fixing step configured to fix the elastic component, one end of the elastic component is fixed on the fixing step and the other end of the elastic component is fixed on the housing.

* * * * *